United States Patent
Matsunami

(10) Patent No.: US 10,019,618 B2
(45) Date of Patent: Jul. 10, 2018

(54) BIOMETRIC INFORMATION CORRECTING APPARATUS AND BIOMETRIC INFORMATION CORRECTING METHOD

(71) Applicant: FUJITSU LIMITED, Kawasaki-shi, Kanagawa (JP)

(72) Inventor: Tomoaki Matsunami, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 209 days.

(21) Appl. No.: 14/866,181

(22) Filed: Sep. 25, 2015

(65) Prior Publication Data

US 2016/0104030 A1  Apr. 14, 2016

(30) Foreign Application Priority Data

Oct. 10, 2014 (JP) ................................ 2014-208998

(51) Int. Cl.
  G06K 9/00 (2006.01)
  G06K 9/32 (2006.01)

(52) U.S. Cl.
  CPC ..... *G06K 9/00087* (2013.01); *G06K 9/00006* (2013.01); *G06K 9/00013* (2013.01); *G06K 9/00067* (2013.01); *G06K 9/3275* (2013.01); *G06K 2009/00932* (2013.01)

(58) Field of Classification Search
  CPC ........... G06K 9/00087; G06K 9/00006; G06K 9/00067; G06K 9/3275; G06F 21/32
  USPC ....................................................... 382/115
  See application file for complete search history.

(56) References Cited

U.S. PATENT DOCUMENTS

| | | | | |
|---|---|---|---|---|
| 9,594,891 | B2* | 3/2017 | Iwata | G06F 21/32 |
| 2002/0141620 | A1* | 10/2002 | Monden | G06K 9/00067 382/115 |
| 2004/0264742 | A1* | 12/2004 | Zhang | G06K 9/00067 382/115 |
| 2011/0222740 | A1 | 9/2011 | Kitane | |

(Continued)

FOREIGN PATENT DOCUMENTS

| | | |
|---|---|---|
| JP | 2006-280835 A | 10/2006 |
| JP | 2007-524143 | 8/2007 |

(Continued)

OTHER PUBLICATIONS

Dapeng Zhang et al, "Two novel characteristics in palmprint verification:datum point invariance and line feature matching", Apr. 1, 1999, Pattern recognition, Elsevier, GB, vol. 32, No. 4, pp. 691-702.*

(Continued)

*Primary Examiner* — Van D Huynh
(74) *Attorney, Agent, or Firm* — Fujitsu Patent Center

(57) ABSTRACT

A biometric information correcting apparatus includes: a palm print feature point extracting unit that extracts two feature points of a palm print of a user's hand from a first image obtained by capturing the palm print and representing the palm print; and a correcting unit that rotates a vein pattern of the user's hand on a second image or a feature portion of the vein pattern extracted from the second image, according to an orientation of a line joining the two feature points, the second image being obtained by a biometric information acquiring unit capturing the vein pattern, the second image being obtained by a biometric information acquiring unit capturing the vein pattern.

16 Claims, 8 Drawing Sheets

(56) References Cited

U.S. PATENT DOCUMENTS

| | | | |
|---|---|---|---|
| 2011/0274318 A1 | 11/2011 | Shindo et al. | |
| 2012/0281890 A1* | 11/2012 | Kamakura | G06K 9/00067 |
| | | | 382/126 |
| 2015/0213321 A1* | 7/2015 | Okazaki | G06K 9/00013 |
| | | | 382/116 |

FOREIGN PATENT DOCUMENTS

| | | |
|---|---|---|
| JP | 2008-134862 | 6/2008 |
| JP | 2010-026658 | 2/2010 |
| JP | 2011-191838 | 9/2011 |
| WO | 2004/111919 | 12/2004 |
| WO | 2010/086993 | 8/2010 |

OTHER PUBLICATIONS

Zhang, Dapeng et al., "Two novel characteristics in palmprint verification: datum point invariance and line feature matching," Pattern Recognition, vol. 32, No. 4, Apr. 1, 1999, pp. 691-702.

You, Jane et al., "Hierarchical palmprint identification via multiple feature extraction," Pattern Recognition, vol. 35, No. 4, Apr. 1, 2002, pp. 847-859.

Wu, Xiangqian et al.,"Palmprint classification using principal lines," Pattern Recognition, vol. 37, No. 10, Oct. 1, 2004, pp. 1987-1998.

Li, Wenxin et al., "Image alignment based on invariant features for palmprint identification," Signal Processing: Image Communication, vol. 18, No. 5, May 1, 2003, pp. 373-379.

Zhang, David, "Palmprint Preprocessing," In:"Palmprint Authentication" Dec. 31, 2004, pp. 37-48.

Extended European Search Report dated Feb. 17, 2016 for corresponding European Patent Application No. 15186876.7, 7 pages.

Korean Office Action dated Apr. 20, 2017 for corresponding Korean Patent Application No. 10-2015-0135289, with English Translation, 7 pages.

Jin, Jing-xuan, "Study on Palmprint Recognition Technique Based on Wavelet Transforms", Chinese Doctoral Dissertations & Master's Theses Full-text Databse (Master) Information Science and Technology, No. 12, Dec. 15, 2006, pp. 7-8, p. 14 and Fig. 2-2, with English Abstract.

Shu, Wei et al.,"Automatic palmprint datum points determination by directional projection", Journal of Tsinghua University (Science and Technology), No. 1, 39(1): 98-100, pp. 1-7, Jan. 31, 1999, with English Abstract.

Chinese Office Action dated Jan. 2, 2018 for corresponding Chinese Patent Application No. 201510632750.5, with English Translation, 26, pages.

Korean Office Action dated Nov. 13, 2017 for corresponding Korean Patent Application No. 10-2015-0135289, with English Translation, 6 pages.

\* cited by examiner

BIOMETRIC INFORMATION CORRECTING APPARATUS AND BIOMETRIC INFORMATION CORRECTING METHOD

CROSS-REFERENCE TO RELATED APPLICATION

This application is based upon and claims the benefit of priority of the prior Japanese Patent Application No. 2014-208998, filed on Oct. 10, 2014, and the entire contents of which are incorporated herein by reference.

FIELD

The embodiments discussed herein are related to a biometric information correcting apparatus and a biometric information correcting method for correcting biometric information represented on an image.

BACKGROUND

Recent years have seen development of the biometric authentication technology for determining whether or not to authenticate an individual, by using biometric information such as a fingerprint or a finger vein pattern. The biometric authentication technology is widely used to make a determination on accessibility to a variety of services, such as determination on whether or not to allow room entry/exit, determination on whether or not to allow access to computer, and user authentication in on-line transactions.

For example, when a hand vein pattern is used as biometric information, a biometric authentication apparatus acquires a biometric image representing a vein pattern by a sensor, as an input biometric image. The biometric authentication apparatus determines whether or not input biometric information, which is the vein pattern of a user represented by the input biometric image matches registered biometric information, which is a vein pattern represented by a registered user's biometric image registered in advance. When it is determined that the input biometric information and registered biometric information match, on the basis of a result of the matching process, the biometric authentication apparatus authenticates the user as being an authorized registered user. Then, the biometric authentication apparatus permits the authenticated user to use a host apparatus in which the biometric authentication apparatus is incorporated, or an apparatus connected to the biometric authentication apparatus.

In some cases, the posture of a portion including biometric information with respect to a sensor may differ between the time of registration and the time of matching of biometric information. In such a case, the orientation, the position, and the scale of the biometric information represented on the obtained biometric image may differ between the time of registration and the time of matching. When the orientation, the position, or the scale of the biometric information on the biometric image differ between the time of registration and the time of matching, positions of feature points of the biometric information also differ between the biometric images. This is not preferable due to an increase in the false rejection rate. In view of the above, there have been proposed techniques for reducing a positional deviation of biometric information on a biometric image (see, e.g., PCT International Publication No. 2010/086993, Japanese Laid-open Patent Publication No. 2008-134862, and Japanese Laid-open Patent Publication No. 2010-26658).

For example, the authentication apparatus disclosed in PCT International Publication No. 2010/086993 calculates the difference in the position of a body part relative to an imaging apparatus at the time of registration and matching, and outputs guidance information to prompt the user to reduce the difference.

The vein authentication apparatus disclosed in Japanese Laid-open Patent Publication No. 2008-134862 captures a finger knuckle print image on the pad side of a finger, and calculates a positional deviation of the placed finger from the finger knuckle print image and a distance value representing the deviation for correcting the position of a vein image.

The palm position detecting apparatus disclosed in Japanese Laid-open Patent Publication No. 2010-26658 detects the horizontal direction of the palm in the image, and rotates the image on the basis of the horizontal direction for detecting the coordinates of the upper, lower, left, and right ends of the palm.

SUMMARY

In the technique disclosed in PCT International Publication No. 2010/086993, however, unless the user appropriately corrects the position of the a body part according to the guidance information, the difference between the position of the a body part on the biometric image input at the time of registration and at the time of matching does not decrease. In the technique disclosed in Japanese Laid-open Patent Publication No. 2008-134862, even when the finger knuckle print position at the time of registration and the finger knuckle print position at the time of matching are the same, when the orientation of the finger differs between the time of registration and the time of matching, it is difficult to appropriately correct the positional deviation of the vein, because the positions of finger knuckle prints are the same between the time of registration and the time of matching. In the technique disclosed in Japanese Laid-open Patent Publication No. 2010-26658, biometric information to be used in matching, and the upper, lower, left, and right ends of the palm to be used in correcting the orientation deviation and the positional deviation are not represented on one image, in some cases. In such a case, an image of biometric information is repeatedly captured until an image including biometric information and the upper, lower, left, and right ends of the palm is obtained, in order to appropriately correct the orientation deviation and the positional deviation.

According to an embodiment, a biometric information correcting apparatus is provided. The biometric information correcting apparatus includes a palm print feature point extracting unit that extracts two feature points of a palm print of a user's hand from a first image obtained by capturing the palm print and representing the palm print; and a correcting unit that rotates a vein pattern of the user's hand on a second image or a feature portion of the vein pattern extracted from the second image, according to an orientation of a line joining the two feature points, the second image being obtained by a biometric information acquiring unit capturing the vein pattern.

The object and advantages of the invention will be realized and attained by means of the elements and combinations particularly indicated in the claims.

It is to be understood that both the foregoing general description and the following detailed description are exemplary and explanatory and are not restrictive of the invention, as claimed.

DESCRIPTION OF EMBODIMENTS

In the following, a biometric information correcting apparatus will be described with reference to the drawings.

The biometric information correcting apparatus corrects deviation of the orientation, the position, and the scale of a vein pattern on a vein image representing the vein pattern of a hand to be used in matching, between the time of registration and the time of matching. For this purpose, the biometric information correcting apparatus detects two feature points of a palm print from a palm print image representing the palm print, which is obtained by capturing the palm print of a hand including a vein pattern when a vein image is obtained. Then, the biometric information correcting apparatus rotates the vein pattern on the vein image so that an orientation of a line joining two points on the vein image corresponding to the two respective feature points coincides with a predetermined direction.

In this specification, the term "matching process" is used to refer to the process for calculating an index that indicates the degree of difference or the degree of similarity between user's biometric information input at the time of registration and at the time of matching. Further, the term "biometric authentication process" is used to refer to the entire authentication process that includes not only the matching process but also the process for determining whether the user is an authenticated user or not by using the index obtained by the matching process.

Figure 1:
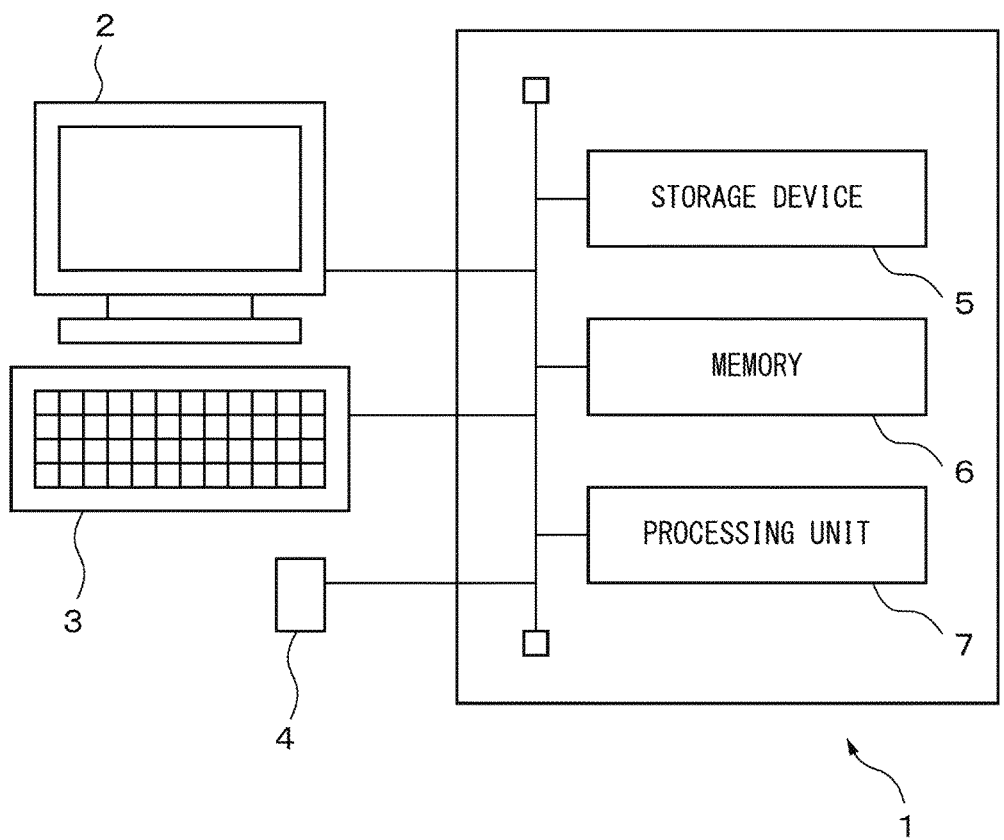
FIG. 1 is a diagram schematically illustrating the configuration of a biometric authentication apparatus according to a first embodiment of a biometric information correcting apparatus.

FIG. 1 is a diagram schematically illustrating a biometric authentication apparatus according to a first embodiment of the biometric information correcting apparatus. As illustrated in FIG. 1, a biometric authentication apparatus 1 includes a display unit 2, an input unit 3, a biometric information acquiring unit 4, a storage device 5, a memory 6, and a processing unit 7. The display unit 2, the input unit 3, and the biometric information acquiring unit 4 may be provided separately from the housing containing the storage device 5, the memory 6, and the processing unit 7. Alternatively, the display unit 2, the input unit 3, the biometric information acquiring unit 4, the storage device 5, the memory 6, and the processing unit 7 may be contained in a single housing. The biometric authentication apparatus 1 may further include a storage medium access device (not illustrated) for accessing a storage medium such as a semiconductor memory card or an optical storage medium. Then, the biometric authentication apparatus 1 may read out, via the storage medium access device, a biometric authentication computer program stored on the storage medium and to be executed on the processing unit 7, and may carry out the biometric authentication process in accordance with the computer program.

The biometric authentication apparatus 1 carries out the biometric authentication process on the basis of a vein image representing a vein pattern of the user's hand generated by the biometric information acquiring unit 4, by comparing the user's vein pattern with each registered user's vein pattern. When the user is authenticated as being one of the registered users as a result of the biometric authentication process, the biometric authentication apparatus 1 permits the user to use a host apparatus in which the biometric authentication apparatus 1 is incorporated. Alternatively, the biometric authentication apparatus 1 transmits, to another apparatus (not illustrated), a signal indicating that the user is authenticated, and permits the user to use the other apparatus.

The display unit 2 includes a display device such as a liquid crystal display, for example. The display unit 2 displays, to the user, a guidance message indicating the position to place his or her hand, for example. The display unit 2 also displays a message indicating the result of the biometric authentication process carried out by the processing unit 7, or various kinds of information associated with applications being executed.

The input unit 3 includes a user interface such as a keyboard, a mouse, or a touchpad, for example. User identification information such as the user name or the user number, a command, or data entered via the input unit 3 by the user is passed to the processing unit 7. However, when the user does not need to enter any information other than biometric information to the biometric authentication apparatus 1, the input unit 3 may be omitted.

The biometric information acquiring unit 4 captures the vein pattern of one of the hands of the user from the palm side of the hand, and generates a vein image representing the vein pattern, for example. Further, the biometric information acquiring unit 4 captures the palm including the vein pattern to be used in matching from the palm side of the hand, and generates a palm print image representing the palm print of the hand.

The biometric information acquiring unit 4 includes, for example, a first illuminating light source for emitting near-infrared light, a second illuminating light source for emitting visible light, and an area sensor including a two-dimensional array of solid-state image sensing devices sensitive to the near-infrared light and to the visible light. The biometric information acquiring unit 4 further includes an imaging optical system for forming an image of a vein pattern or a palm print on the area sensor. The biometric information acquiring unit 4 further includes a base on which a hand is to be placed while the palm is facing upward. The area sensor, the first illuminating light source, and the second illuminating light source are disposed above the base while being directed downward so as to face the base with the hand placed therebetween. The first illuminating light source may be an infrared light emitting diode, for example. The second illuminating light source may be a white light emitting diode, for example.

For capturing a vein pattern, for example, the biometric information acquiring unit 4 turns on the first illuminating light source and turns off the second illuminating light source in response to a control signal from the processing unit 7, and captures the vein pattern. The biometric information acquiring unit 4 outputs a vein image obtained by the capturing to the processing unit 7. For capturing a palm print, for example, the biometric information acquiring unit 4 turns off the first illuminating light source and turns on the second illuminating light source in response to a control signal from the processing unit 7, and captures the palm print. The biometric information acquiring unit 4 outputs a palm print image obtained by the capturing to the processing unit 7.

The storage device 5 is an example of a storage unit, and includes, for example, a magnetic recording disk and an access device for accessing the magnetic recording disk. The storage device 5 stores an application program to be used in the biometric authentication apparatus 1, the user name, user identification number, and personal setting information of at least one registered user, various kinds of data, and the like. The storage device 5 also stores a program for carrying out the biometric authentication process. Further, for each registered user, the storage device 5 stores matching feature information representing the features of the vein pattern of one of the hands, the vein pattern being the biometric information of the registered user, together with the user identification information of the registered user such as the user name and user identification number of the registered user.

In the present embodiment, the matching feature information includes, when each vein included in the vein pattern represented on each vein image is represented by a plurality of line segments, information indicating the position, the length, and the inclination of each line segment. The position of each line segment is represented by the coordinates of the middle point of the line segment on the vein image. The length of each line segment is represented by the coordinates of the two end points of the line segment or the distance between the two ends of the line segment, for example. The inclination of each line segment is represented by the angle between a horizontal line on the vein image and the line segment, for example. The matching feature information of each registered user is obtained by a registration process to be described later, and is then stored in the storage device 5.

The memory 6 is another example of the storage unit, and includes, for example, a nonvolatile semiconductor memory and a volatile semiconductor memory. The memory 6 temporarily stores various data to be used in the program being executed on the processing unit 7.

The processing unit 7 includes one or more processors and peripheral circuitry thereof. The processing unit 7 controls each unit of the biometric authentication apparatus 1. For example, the processing unit 7 controls the biometric information acquiring unit 4 so that the biometric information acquiring unit 4 captures a vein pattern of one of the hands of the user and a palm print of the hand. Preferably, the processing unit 7 causes the biometric information acquiring unit 4 to capture the vein pattern and the palm print within a time period during which the user's hand remains still, for example, within several hundred msec. Then, the processing unit 7 obtains a vein image representing the vein pattern and a palm print image representing the palm print from the biometric information acquiring unit 4. Then, the processing unit 7 corrects the orientation, the position, and the scale of the vein pattern represented on the vein image, on the basis of the palm print image. Then, the processing unit 7 extracts matching feature information from the vein image in which the orientation, the position, and the scale of the vein pattern are corrected. Then, the processing unit 7 registers the matching feature information, or judges whether or not authenticate the user, by using the matching feature information.

Figure 2:
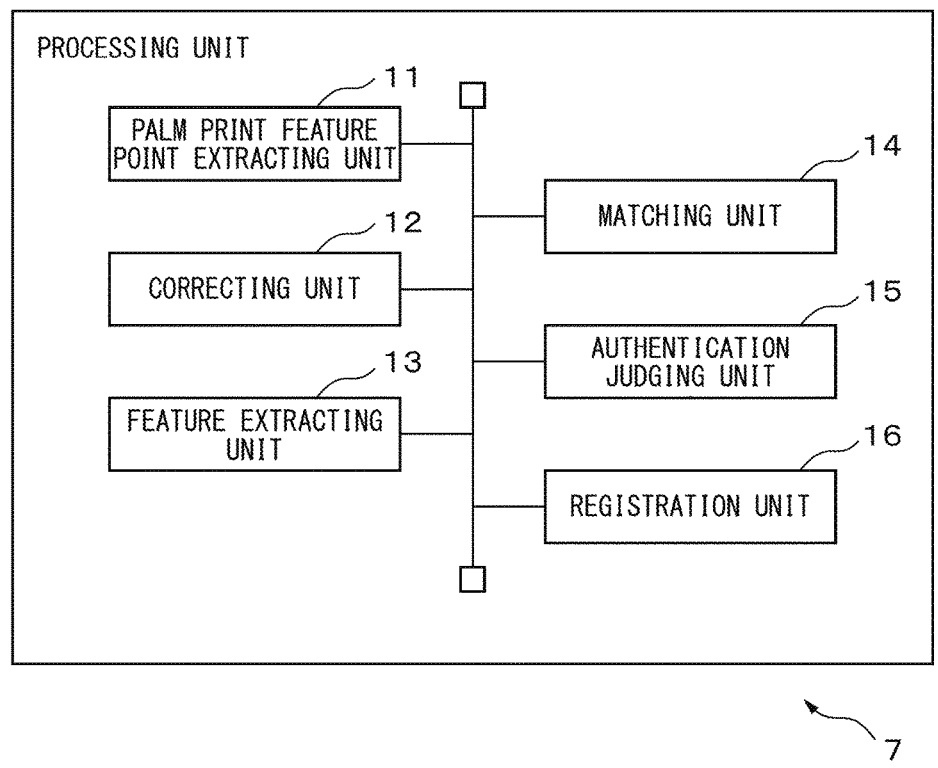
FIG. 2 is a functional block diagram of a processing unit of the biometric authentication apparatus according to the first embodiment.

FIG. 2 is a functional block diagram of the processing unit 7. As illustrated in FIG. 2, the processing unit 7 includes a palm print feature point extracting unit 11, a correcting unit 12, a feature extracting unit 13, a matching unit 14, an authentication judging unit 15, and a registration unit 16. These units included in the processing unit 7 are functional modules implemented by executing a computer program executed on a processor contained in the processing unit 7. Alternatively, these units included in the processing unit 7 may be implemented as firmware on the biometric authentication apparatus 1.

The palm print feature point extracting unit 11, the correcting unit 12, and the feature extracting unit 13 are used in both the biometric authentication process and the registration process. The matching unit 14 and the authentication judging unit 15 are used in the biometric authentication process. Meanwhile, the registration unit 16 is used in the registration process. In the following, the units related to the biometric authentication process will be described first.

The palm print feature point extracting unit 11 extracts, from a palm print image, two feature points of a palm print at different positions, which serve as reference points in correcting the position of a vein image.

Figure 3:
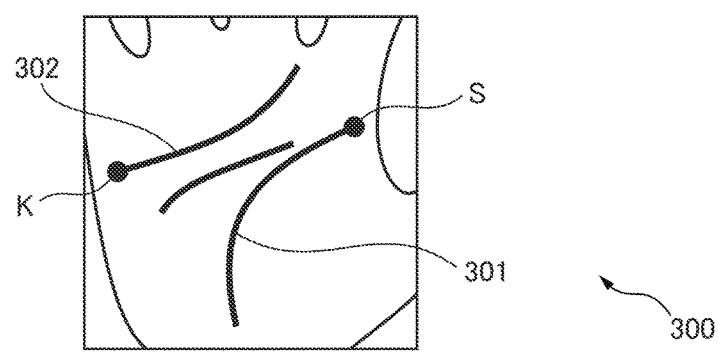
FIG. 3 is a diagram illustrating an example of a palm print image.

FIG. 3 is a diagram illustrating an example of a palm print image. A palm print is represented on a palm print image 300. Particularly, principal lines such as the line of Heart, the line of Head, and the line of Life are thick wrinkles on a palm print, and are therefore relatively distinguishable as compared with the other wrinkles. Hence, it is highly likely that the principal lines are accurately detected from a palm print image. In view of the above, in the present embodiment, the palm print feature point extracting unit 11 extracts, from among the end points of the principal lines, the leftmost end point and the rightmost end point, as feature points of a palm print. In the example illustrated in FIG. 3, the palm print of a right hand is represented on the palm print image 300. Therefore, a thumb-side end point S of a line of Life 301 and a little-finger-side end point K of a line of Heart 302 are extracted as the feature points. Thus, the biometric authentication apparatus 1 can correct the orientation of a vein pattern on a vein image on the basis of the two accurately detectable reference points, which are relatively away from each other. This makes it possible to reduce an influence of a positional deviation of reference points resulting from detection error of the feature points and the like on correction of the orientation of a vein pattern.

In the present embodiment, the palm print feature point extracting unit 11 differentiates a subject region including a palm, and a background region not including the palm, on the palm print image in order to extract feature points of the palm print. In the present embodiment, the second illuminating light source and the area sensor of the biometric information acquiring unit 4 are disposed to face the same side of the hand. Therefore, the luminance values of the pixels representing the user's palm are higher than the luminance values of the pixels not representing the user's palm. In view of this, the palm print feature point extracting unit 11 extracts, for example, a group of pixels in which a luminance value of each pixel is not smaller than a subject judging threshold value, as a subject region. The subject judging threshold value is set, for example, at a preset fixed value (e.g., 10), or the average value of the luminance values of the respective pixels in the palm print image.

Then, the palm print feature point extracting unit 11 binarizes the subject region on the basis of the palm print judging threshold value for creating a binarized palm print image in which groups of pixels having a possibility of representing wrinkles on the palm and a group of the other pixels are differentiated. For example, the luminance value of each pixel representing wrinkles on the palm is lower than the luminance value of each pixel around the pixels representing the wrinkles. In view of this, the palm print feature point extracting unit 11 judges each pixel having a luminance value not larger than the palm print judging threshold value as a pixel having a possibility of representing a wrinkle on the palm, while judging each pixel having a luminance value larger than the palm print judging threshold value as a pixel not representing any wrinkle. The palm print judging threshold value is set, for example, at the average value of the luminance values of the pixels in the subject region. Alternatively, the palm print judging threshold value may be determined by applying Otsu's method for binarization to the distribution of the luminance values of the pixels in the subject region. In the following, each pixel having a possibility of representing a wrinkle on the palm will be referred to as a wrinkle pixel, for convenience.

Alternatively, the palm print feature point extracting unit 11 may apply an edge detection filter such as a Sobel filter or a Laplacian filter to each pixel in a subject region, and may set each detected pixel as a wrinkle pixel.

The palm print feature point extracting unit 11 applies a thinning process to each group of wrinkle pixels in the binarized palm print image, thus thinning a line joining the wrinkle pixels to form a line having a width of one pixel, for example. The palm print feature point extracting unit 11 performs a labeling process with respect to the thinned and binarized palm print image, and assigns different labels for respective lines each joining the wrinkle pixels. Thus, the lines each joining the wrinkle pixels are differentiated from each other. The principal lines on a palm print are relatively long. Therefore, the palm print feature point extracting unit 11 selects a predetermined number of longest lines (e.g. four, which is equal to the number of principal lines) from among the lines joining the wrinkle pixels. Then, the palm print feature point extracting unit 11 sets an intersection between any one of the principal lines and the right end of the subject region, and an intersection between any one of the principal lines and the left end of the subject region, as feature points of the palm print. When the hand represented on the palm print image is the user's right hand, the palm print feature point extracting unit 11 sets a point at which any one of the principal lines intersects the right end of the subject region, as the thumb-side end point S of the line of Life, and sets a point at which any one of the principal lines intersects the left end of the subject region, as the little-finger-side end point K of the line of Heart.

When none of the principal lines intersects the right end of the subject region, the palm print feature point extracting unit 11 may set the rightmost end point among the end points of the principal lines, as the thumb-side end point S of the line of Life. Likewise, when none of the principal lines intersects the left end of the subject region, the palm print feature point extracting unit 11 may set the leftmost end point among the end points of the principal lines, as the little-finger-side end point K of the line of Heart.

When the hand represented on the palm print image is the user's left hand, conversely to the above-described example, the palm print feature point extracting unit 11 sets a point at which the selected principal line intersects the left end of the subject region, as the thumb-side end point S of the line of Life, and sets a point at which the selected principal line intersects the right end of the subject region, as the little-finger-side end point K of the line of Heart.

The palm print feature point extracting unit 11 notifies the correcting unit 12 of the coordinates of the end point K and the coordinates of the end point S.

The correcting unit 12 corrects the orientation of the vein pattern on the vein image depending on the orientation of a line joining the end point K and the end point S, which are the two feature points of the palm print. In the present embodiment, the correcting unit 12 further corrects the position and the scale of the vein pattern on the vein image on the basis of the end point K and the end point S. In the following, two points on a vein image which correspond to two feature points of a palm print and which are used as a reference in correcting the orientation, the position, and the like, are referred to as reference points, for convenience.

In the present embodiment, both of a palm print image and a vein image are generated by the biometric information acquiring unit 4. Therefore, it is assumed that a pixel K' of the vein image, which is located at the same position as the end point K of the line of Heart on the palm print image, is located at the position of the end point K of the line of Heart. Likewise, it is assumed that a pixel S' of the vein image, which is located at the same position as the end point S of the line of Life on the palm print image, is located at the position of the end point S of the line of Life. In view of the above, the correcting unit 12 sets the pixel K' and the pixel S' as the reference points.

The correcting unit 12 performs parallel translation of each pixel on the vein image so that the vein pattern is located at a predetermined position on the vein image. For this purpose, the correcting unit 12 obtains a middle point C between the reference point K' and the reference point S'. Then, the correcting unit 12 obtains the amount of deviation between the middle point C and the center of the vein image as a parallel translation amount, and performs parallel translation of each pixel on the vein image by the parallel translation amount so that the middle point C coincides with the center of the vein image.

Figure 4A:
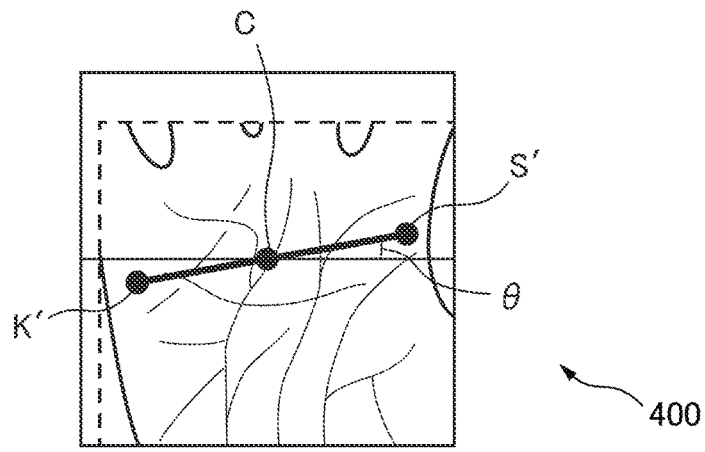
FIG. 4A is a diagram illustrating an example of a vein image after the position of a vein pattern is corrected.

FIG. 4A is a diagram illustrating an example of a vein image after the position of a vein pattern is corrected. In a vein image 400, parallel translation is performed for each pixel so that the middle point C between the reference point K' and the reference point S' coincides with the center of the vein image 400.

Subsequently, the correcting unit 12 rotates each pixel on the vein image so that the orientation of the vein pattern coincides with a predetermined direction. In the present embodiment, the correcting unit 12 obtains, as the orientation of the line, the angle θ of a line joining the reference point K' and the reference point S' with respect to a horizontal direction so that an orientation of the line joining the reference point K' and the reference point S' coincides with the horizontal direction on the vein image. Then, the correcting unit 12 rotates each pixel on the vein image by the angle (−θ) around the middle point C between the reference point K' and the reference point S', on the vein image after the parallel translation.

Figure 4B:
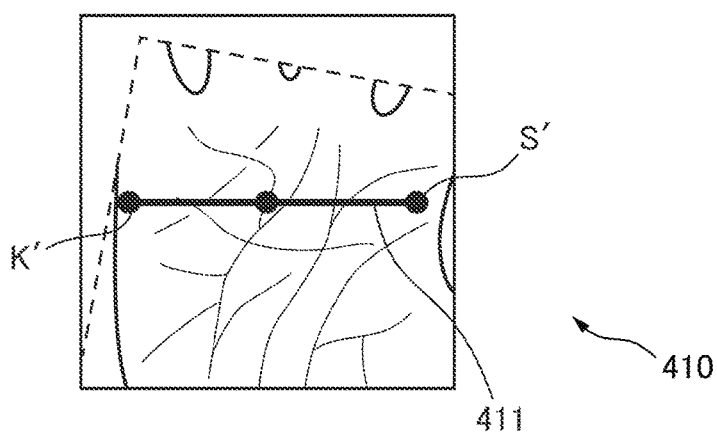
FIG. 4B is a diagram illustrating an example of a vein image after the rotation of a vein pattern is corrected.

FIG. 4B is a diagram illustrating an example of a vein image after the orientation of a vein pattern is corrected. In a vein image 410, each pixel is rotated so that an orientation of a line 411 joining the reference point K' and the reference point S' coincides with the horizontal direction.

After the orientation of the vein pattern is corrected, the correcting unit 12 corrects the scale of the vein pattern so that the distance between the reference point K' and the reference point S' is equal to a predetermined distance. In the present embodiment, the correcting unit 12 obtains the ratio of a horizontal size of the vein image to the distance between the reference point K' and the reference point S', as a scale adjustment amount. The correcting unit 12 obtains, for each pixel on the vein image, a corrected distance by multiplying the distance between the middle point C and the pixel by the scale adjustment amount so that the distance between the reference point K' and the reference point S' is equal to the horizontal size of the vein image. Then, the correcting unit 12 moves each pixel on the vein image to the position corresponding to the corrected distance along the direction from the middle point C toward the pixel on the vein image. Thus, it is possible to obtain a vein image in which the orientation, the position, and the scale of the vein pattern on the vein image are corrected.

Figure 4C:
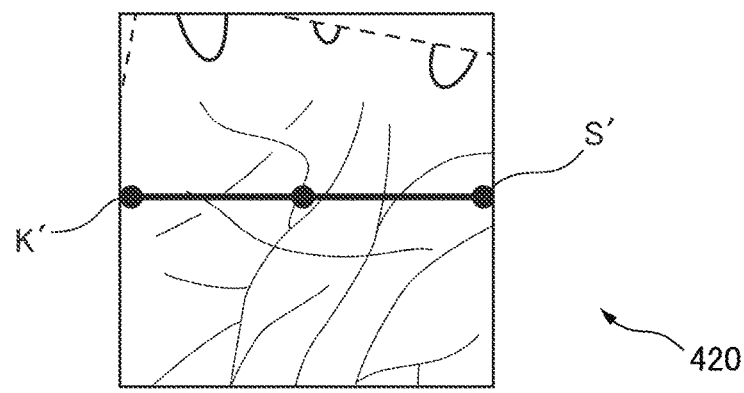
FIG. 4C is a diagram illustrating an example of a vein image after the scale of a vein pattern is corrected.

FIG. 4C is a diagram illustrating an example of a vein image after the scale of a vein pattern is corrected. In a vein image 420, the scale of the vein pattern is adjusted so that the reference point K' and the reference point S' are located at image ends of the vein image 420.

The correcting unit 12 may obtain a parallel translation amount, a rotation amount, and a scale adjustment amount on the basis of the reference point K' and the reference point S' before the position of each pixel on the vein image is actually moved. The correcting unit 12 may obtain a corrected vein image by applying affine transformation to each pixel on the vein image, using an affine transformation coefficient obtained from the parallel translation amount, the rotation amount, and the scale adjustment amount.

The correcting unit 12 passes the corrected vein image to the feature extracting unit 13.

The feature extracting unit 13 extracts matching feature information, which is feature information to be used in matching, from a corrected vein image. In the present embodiment, the feature extracting unit 13 extracts a plurality of line segments approximately representing the veins, which are represented on the corrected vein image, as the matching feature information.

The feature extracting unit 13 applies, to the vein image, the same process as that applied when the palm print feature point extracting unit 11 specifies a subject region from a palm print image, for differentiating the subject region including a hand, and the background region not including the hand, on the vein image.

Subsequently, the feature extracting unit 13 binarizes the subject region or the inscribed rectangular area of the subject region on the basis of the vein judging threshold value to create a binarized vein image in which groups of pixels having a possibility of representing veins and a group of the other pixels are differentiated. For example, the luminance value of each pixel representing a vein is lower than the luminance value of each pixel around the pixel representing a vein. In view of this, the feature extracting unit 13 judges each pixel having a luminance value not larger than the vein judging threshold value as a pixel having a possibility of representing a vein, while judging each pixel having a luminance value larger than the vein judging threshold value as a pixel not representing any vein. The vein judging threshold value is set, for example, at the average value of the luminance values of the pixels in the subject region. Alternatively, the vein judging threshold value may be determined by applying Otsu's method for binarization to the distribution of the luminance values of the pixels in the subject region. In the following, each pixel having a possibility of representing a vein will be referred to as a vein pixel, for convenience.

The feature extracting unit 13 applies a thinning process to each group of vein pixels on the binarized vein image, thus thinning a line joining the vein pixels to form a line having a width of one pixel, for example. Each line obtained by the thinning represents a single vein. Since a vein is not a straight line in general, the feature extracting unit 13 divides each line obtained by the thinning into a plurality of line segments, which approximately represent a vein.

The feature extracting unit 13 carries out, for example, the following process on each line obtained by the thinning, to divide the line into a plurality of line segments. In the following, a line which is obtained by the thinning and to which the process is applied will be referred to as a target line, for convenience.

The feature extracting unit 13 calculates a straight line joining the two ends of the target line, and obtains the distance between each pixel on the target line and the straight line. When the largest value among the obtained distances is not smaller than a predetermined threshold value (e.g., 5), the feature extracting unit 13 divides the target line at the pixel corresponding to the largest distance value. The feature extracting unit 13 carries out the above-described process by using, as a next target line, each line obtained by dividing the target line. The feature extracting unit 13 repeatedly carries out the above-described process until the largest distance value becomes smaller than a predetermined threshold value. When the largest distance value is smaller than the predetermined threshold value, the feature extracting unit 13 determines the target line as a single line segment.

The feature extracting unit 13 calculates, for each obtained line segment, the coordinates of the middle point of the line segment, as the position of the line segment. The feature extracting unit 13 also calculates, for each line segment, the length and the inclination of the line segment as the attributes of the line segment. Then, when the biometric authentication process is carried out, the feature extracting unit 13 outputs the matching feature information including the coordinates of the middle point, the length, and the inclination of each line segment, to the matching unit 14.

Alternatively, the feature extracting unit 13 may set a corrected vein image itself, or a binarized vein image obtained from a corrected vein image, as the matching feature information.

When the registration process is to be performed, the feature extracting unit 13 outputs the matching feature information to the registration unit 16.

The matching unit 14 compares the user's vein pattern with each registered user's vein pattern by using the user's matching feature information and each registered user's matching feature information. Then, the matching unit 14 obtains a matching score indicating the degree of similarity between the user's vein pattern and the registered user's vein pattern, as a result of the matching process.

The matching unit 14 calculates, for example, for each of the line segments included in the user's matching feature information, the distance between the line segment and the closest one of the line segments included in the registered user's matching feature information. The matching unit 14 may set the distance between the middle points of the two respective target line segments as the distance between the two line segments. Alternatively, the matching unit 14 may calculate the total number of pixels that do not match among the pixels included in the two target line segments, i.e., the Hamming distance. In this case, the matching unit 14 may set the value obtained by dividing the Hamming distance by the length of one of the two target line segments, or the Hamming distance itself, as the distance between the two line segments.

The matching unit 14 calculates the inverse of the average value of the distances calculated for the line segments included in the user's matching feature information, as a matching score. In this calculation, when the average distance value is smaller than a predetermined value (e.g., 0.1 to 1), the matching unit 14 may set the matching score at the largest possible value (e.g., 1).

Alternatively, the matching unit 14 may set, as a matching score, the value obtained by dividing the number of line segments each having the distance to the closest one of the line segments included in the registered user's matching feature information, the distance being not larger than a predetermined value, by the total number of line segments included in the user's matching feature information.

When the matching feature information represents a corrected vein image itself, the matching unit 14 may calculate, as a matching score, a normalized cross correlation value between a user's corrected vein image and a registered user's corrected vein image. Likewise, when the matching feature information represents a binarized vein image obtained from a corrected vein image, the matching unit 14 may calculate, as a matching score, a normalized cross correlation value between a user's binarized vein image and a registered user's binarized vein image.

The matching unit 14 passes the matching score and the registered user's identification information to the authentication judging unit 15.

When the matching score is not lower than an authentication judging threshold value, the authentication judging unit 15 judges that the user's vein pattern and the registered user's vein pattern match. Then, the authentication judging unit 15 authenticates the user as being the registered user. When the user is authenticated, the authentication judging unit 15 notifies the processing unit 7 of the authentication result.

On the other hand, when the matching score is lower than the authentication judging threshold value, the authentication judging unit 15 judges that the user's vein pattern and the registered user's vein pattern do not match. In this case, the authentication judging unit 15 does not authenticate the user as being the registered user. The authentication judging unit 15 notifies the processing unit 7 of the authentication result indicating that the authentication of the user was unsuccessful. The processing unit 7 may cause the display unit 2 to display a message indicating the authentication result.

The authentication judging threshold value is preferably set at such a value that the authentication judging unit 15 would successfully authenticate the user only when any one of the registered users is the user. In other words, the authentication judging threshold value is preferably set at such a value that the authentication judging unit 15 would fail to authenticate the user when the user is a person different from the registered users. For example, the authentication judging threshold value may be set at a value obtained by adding the value obtained by multiplying the difference between the largest possible value and the smallest possible value of the matching score by 0.7, to the smallest value of the degree of similarity.

Figure 5:
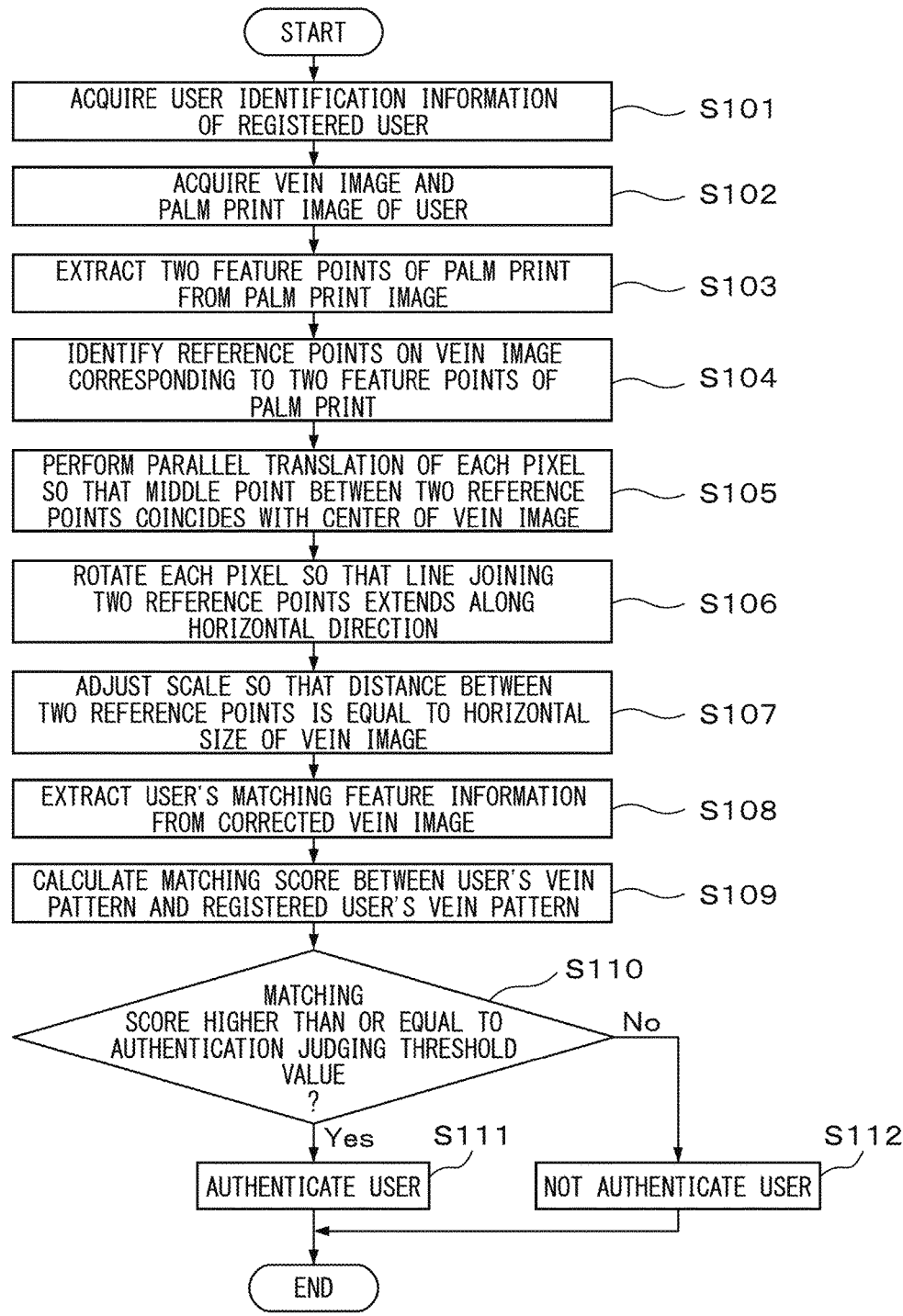
FIG. 5 is an operation flowchart illustrating a biometric authentication process.

FIG. 5 is an operation flowchart illustrating the biometric authentication process carried out by the processing unit 7.

The processing unit 7 acquires user identification information for identifying a registered user who is an authentication target (Step S101). Subsequently, the processing unit 7 receives, from the biometric information acquiring unit 4, a vein image including the vein pattern and a palm print image including the palm print of one of the hands of the user attempting to be authenticated (Step S102).

Then, the palm print feature point extracting unit 11 extracts, from the palm print image, two feature points of the palm print located at different positions (Step S103).

The correcting unit 12 specifies the reference points on the vein image corresponding to the two feature points of the palm print (Step S104). The correcting unit 12 performs parallel translation of each pixel on the vein image so that the middle point between the two reference points coincides with the center of the vein image (Step S105). The correcting unit 12 rotates each pixel on the vein image so that an orientation of a line joining the two reference points coincides with a horizontal direction on the vein image after the parallel translation (Step S106). The correcting unit 12 adjusts the scale of the vein pattern so that the distance between the two reference points is equal to the horizontal size of the vein image, on the vein image after the rotation (Step S107). Then, the correcting unit 12 passes the corrected vein image thus obtained, to the feature extracting unit 13.

The feature extracting unit 13 extracts matching feature information including a plurality of line segments approximately representing a vein pattern, from the corrected vein image (Step S108). Then, the feature extracting unit 13 passes the matching feature information to the matching unit 14.

The matching unit 14 calculates the matching score between the user's vein pattern and the registered user's vein pattern by comparing the user's matching feature information with the registered user's matching feature information to be specified by the user identification information obtained via the input unit 3 (Step S109).

The authentication judging unit 15 judges whether or not the matching score is higher than or equal to the authentication judging threshold value (Step S110). When the matching score is higher than or equal to the authentication judging threshold value (Yes in Step S110), the authentication judging unit 15 judges that the user's vein pattern and the registered user's vein pattern match. Subsequently, the authentication judging unit 15 authenticates the user as being the registered user (Step S111). When the user is authenticated, the authentication judging unit 15 notifies the processing unit 7 of the authentication result. Then, the processing unit 7 permits the authenticated user to use the host apparatus in which the biometric authentication apparatus 1 is incorporated or the apparatus connected to the biometric authentication apparatus 1.

On the other hand, when the matching score is lower than the authentication judging threshold value (No in Step S110), the authentication judging unit 15 judges that the user's vein pattern and the registered user's vein pattern do not match. Accordingly, the authentication judging unit 15 does not authenticate the user (Step S112). Then, the authentication judging unit 15 notifies the processing unit 7 that the user is not authenticated. In this case, the processing unit 7 prohibits the user who is not authenticated, from using the host apparatus in which the biometric authentication apparatus 1 is incorporated or the apparatus connected to the biometric authentication apparatus 1. The processing unit 7 may also cause the display unit 2 to display a message indicating that the authentication failed. After Step S111 or S112, the processing unit 7 terminates the biometric authentication process.

When the so-called 1:N (one-to-many) authentication method is employed, i.e., when user identification information of each registered user is not input, the matching unit 14 calculates a matching score for each of all the registered users. The matching unit 14 selects the registered user having the highest matching score. The matching unit 14 passes the largest value of the matching score and the user identification information of the registered user corresponding to the largest value, to the authentication judging unit 15. When the largest value of the matching score is not lower than the authentication judging threshold value, the authentication judging unit 15 authenticates the user as being the registered user corresponding to the largest value of the matching score.

Next, the registration unit 16 related to the registration process will be described.

In the registration process as in the biometric authentication process, the processing unit 7 receives a vein image and a palm print image of one of the hands of each user to be registered, from the biometric information acquiring unit 4. Then, the palm print feature point extracting unit 11 of the processing unit 7 extracts two feature points of the palm print from the palm print image. The correcting unit 12 corrects the orientation, the position, and the scale of the vein pattern on the vein image on the basis of two reference points on the vein image, corresponding to the two feature points of the palm print. The feature extracting unit 13 extracts matching feature information from the corrected vein image, and outputs the matching feature information to the registration unit 16.

The registration unit 16 acquires the user name of the user to be registered, from the input unit 3. Then, the registration unit 16 sets a user identification number, which is uniquely set for the user. Then, the registration unit 16 stores, in the storage device 5, the user name and the user identification number of the user together with the matching feature information received from the feature extracting unit 13. Through these operations, the user is registered as a registered user who is permitted to use the host apparatus in which the biometric authentication apparatus 1 is incorporated.

As has been described above, the biometric authentication apparatus, as an example of a biometric information correcting apparatus, uses feature points of a palm print including a vein pattern to correct the orientation, the position, and the scale of the vein pattern on a vein image. The feature points of a palm print and a vein pattern are located at positions relatively close to each other. Further, it is possible to relatively accurately detect the feature points of the palm print. Therefore, the biometric authentication apparatus can move a vein pattern represented on a vein image to a predetermined position, and can set the orientation and the scale of the vein pattern to a predetermined orientation and to a predetermined scale. Thus, the biometric authentication apparatus can reduce an influence of deviation of the orientation, the position, or the scale of a vein pattern between the time of registration and the time of matching on a matching result.

Next, a biometric authentication apparatus according to the second embodiment is described. The biometric authentication apparatus according to the second embodiment corrects the orientation, the position, or the like of a vein pattern on a vein image by using a palm print image generated by a palm print acquiring unit that is provided independently of a biometric information acquiring unit.

Figure 6:
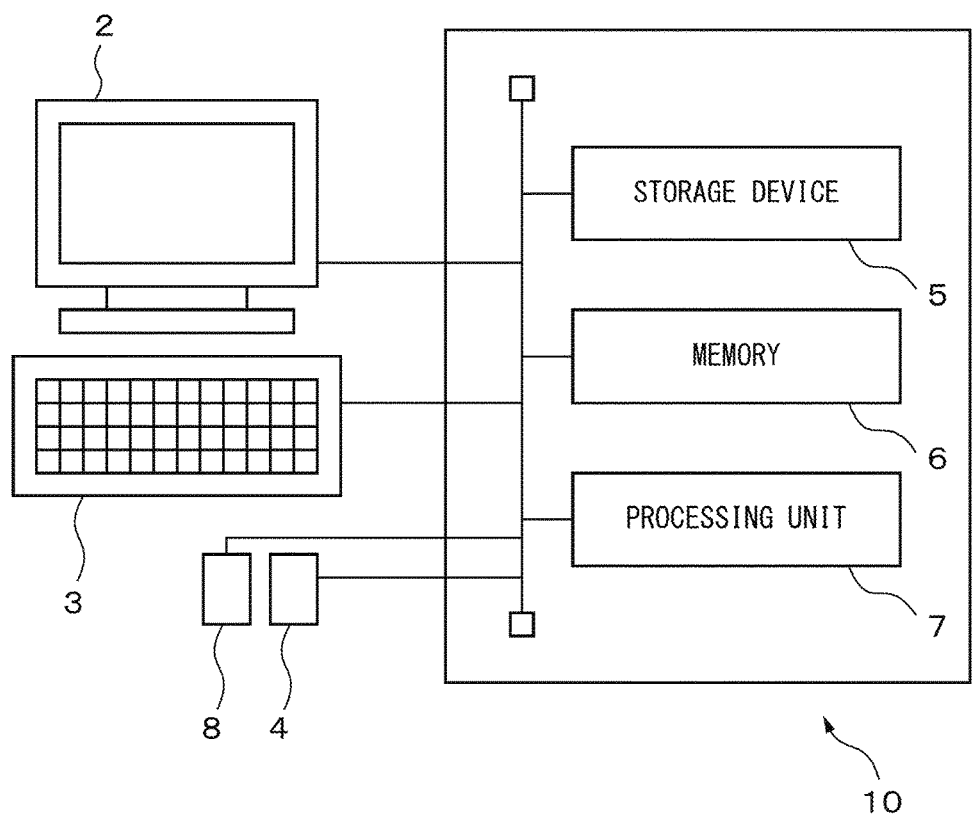
FIG. 6 is a diagram schematically illustrating the configuration of a biometric authentication apparatus according to a second embodiment of the biometric information correcting apparatus.

FIG. 6 is a diagram schematically illustrating the configuration of the biometric authentication apparatus according to the second embodiment of the biometric information correcting apparatus. As illustrated in FIG. 6, a biometric authentication apparatus 10 includes a display unit 2, an input unit 3, a biometric information acquiring unit 4, a storage device 5, a memory 6, a processing unit 7, and a palm print acquiring unit 8.

The biometric authentication apparatus 10 according to the second embodiment is different from the biometric authentication apparatus 1 according to the first embodiment in a point that the palm print acquiring unit 8 for generating a palm print image is provided independently of the biometric information acquiring unit 4 for generating a vein image. In view of the above, the palm print acquiring unit 8 and the unit relevant thereto are described in the following.

The palm print acquiring unit 8 captures, from the palm side, the palm print of a user including a vein pattern to be used in matching, and generates a palm print image representing the palm print. For this purpose, the palm print acquiring unit 8 includes, for example, an illuminating light source for emitting visible light, an area sensor including a two-dimensional array of solid-state image sensing devices sensitive to the visible light, and an imaging optical system for forming an image of a palm print on the area sensor. In the present embodiment, it is assumed that the angle of view of the imaging optical system of the biometric information acquiring unit 4 and the angle of view of the imaging optical system of the palm print acquiring unit 8 are equal to each other. Further, it is assumed that the area sensor of the biometric information acquiring unit 4 and the area sensor of the palm print acquiring unit 8 are disposed at positions where the sensor surfaces of the respective area sensors are parallel to each other, and that the sensor surfaces lie on one plane. Furthermore, it is assumed that the numbers of pixels of the respective area sensors are the same. In addition, the palm print acquiring unit 8 is disposed, for example, to align with the biometric information acquiring unit 4 so that the palm print acquiring unit 8 can capture the palm print without moving the user's hand from the position of the user's hand at the time of the biometric information acquiring unit 4 capturing the vein pattern of the user's hand. The palm print acquiring unit 8 outputs the generated palm print image to the processing unit 7.

Figure 7:
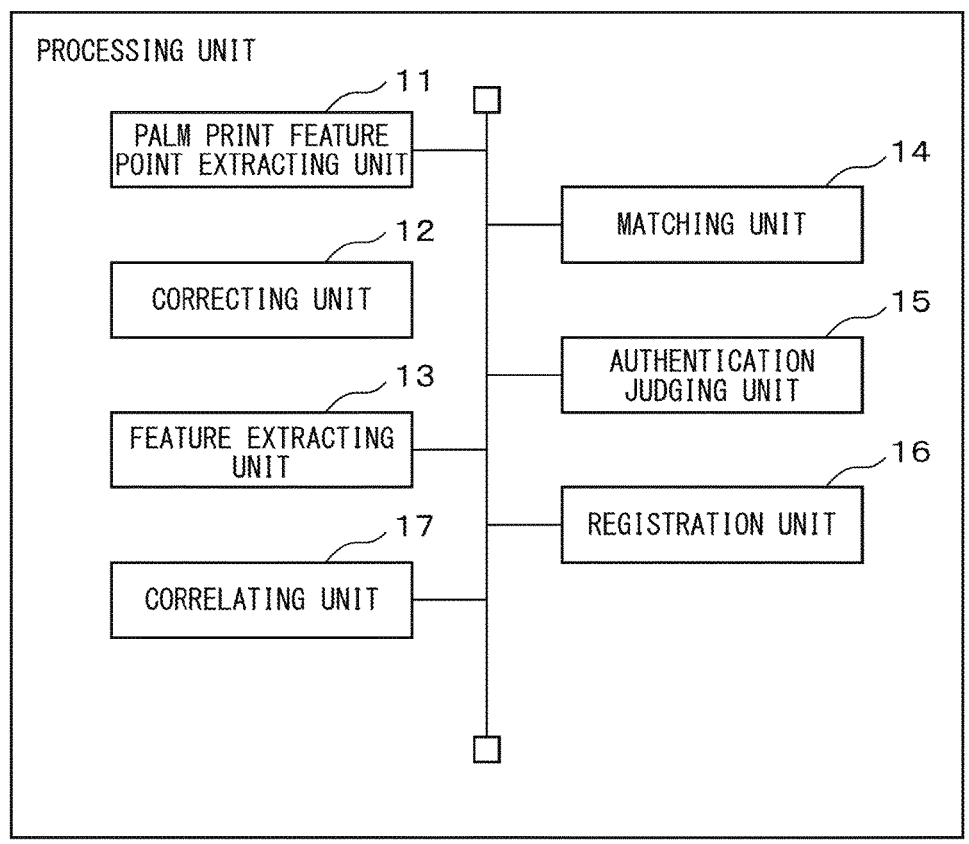
FIG. 7 is a functional block diagram of a processing unit of the biometric authentication apparatus according to the second embodiment.

FIG. 7 is a functional block diagram of the processing unit 7 according to the second embodiment. As illustrated in FIG. 7, the processing unit 7 includes a palm print feature point extracting unit 11, a correcting unit 12, a feature extracting unit 13, a matching unit 14, an authentication judging unit 15, a registration unit 16, and a correlating unit 17. The processing unit 7 according to the second embodiment is different from the processing unit 7 according to the first embodiment in a point that the processing unit 7 according to the second embodiment includes the correlating unit 17. In view of this, in the following, the correlating unit 17 is described.

The correlating unit 17 specifies, on a vein image, reference points corresponding to two feature points K and S of a palm print extracted from a palm print image, according to a positional relationship between the biometric information acquiring unit 4 and the palm print acquiring unit 8. In the present embodiment, the biometric information acquiring unit 4 and the palm print acquiring unit 8 are disposed at different positions. Therefore, the positions on the palm print image and the positions on the vein image corresponding to the feature points K and S of the palm print deviate from each other, according to the positional relationship between the biometric information acquiring unit 4 and the palm print acquiring unit 8.

In the present embodiment, the number of pixels of the area sensor of the biometric information acquiring unit 4 and the number of pixels of the area sensor of the palm print acquiring unit 8 are the same, and the sensor surfaces of the respective area sensors are disposed to lie on one plane. Further, the angle of view of the imaging optical system of the biometric information acquiring unit 4 and the angle of view of the imaging optical system of the palm print acquiring unit 8 are equal to each other. It is assumed that the center of a capturing area of the biometric information acquiring unit 4 is away from the center of a capturing area of the palm print acquiring unit 8 by h inches in a rightward horizontal direction of a vein image and a palm print image, and by v inches in a downward vertical direction of the vein image and the palm print image. It is assumed that the resolution of the vein image and the resolution of the palm print image are n dots per inch (dpi). In this case, the positions on the palm print image and the positions on the vein image corresponding to the feature points K and S of the palm print deviate from each other by (h×n) pixels horizontally and by (v×n) pixels vertically. In view of the above, the correlating unit 17 sets the positions obtained by reducing (h×n) pixels horizontally and (v×n) pixels vertically from the coordinates of the pixels corresponding to the feature points K and S of the palm print on the palm print image, as reference points K' and S'.

The angle of view of the imaging optical system of the biometric information acquiring unit 4 and the angle of view of the imaging optical system of the palm print acquiring unit 8 may differ from each other. Further, the number of pixels of the area sensor of the biometric information acquiring unit 4 and the number of pixels of the area sensor of the palm print acquiring unit 8 may differ from each other. Furthermore, the area sensors may be disposed at positions where the sensor surface of the area sensor of the biometric information acquiring unit 4 and the sensor surface of the area sensor of the palm print acquiring unit 8 lie on different planes. In such a case, the amount of positional deviation between each pixel on the vein image and the corresponding pixel on the palm print image may vary depending on the position of the pixel on the palm print image. In view of the above, for example, a reference table is stored in advance in the storage device 5 for each pixel on a palm print image, the reference table representing a correlation between the coordinates of the pixel on a palm print image and the coordinates of a corresponding pixel on a vein image. Then, the correlating unit 17 may specify the coordinates of the reference points K' and S' on the vein image, corresponding to the feature points K and S of the palm print on the palm print image, by referring to the reference table.

The correlating unit 17 passes the coordinates of the reference points K' and S' on the vein image to the correcting unit 12. Then, the correcting unit 12, as in the first embodiment, corrects the position, the orientation, and the scale of the vein pattern on the vein image on the basis of the reference points K' and S'.

According to the second embodiment, the biometric authentication apparatus can correct the position, the orientation, and the scale of a vein pattern on a vein image on the basis of feature points of a palm print, even when it is difficult to configure a biometric information acquiring unit for capturing the vein pattern and a palm print acquiring unit for capturing the palm print as one device.

According to a modified example of any one of the above-described embodiments, a palm print feature point extracting unit 11 may obtain a pair of tangent lines to two approximation curves obtained by approximating two of the principal lines of a palm print, the pair of tangent lines forming the smallest angle. The palm print feature point extracting unit 11 may set an intersection point between each of the tangent lines in the pair of tangent lines and the corresponding approximation curve, as a feature point of the palm print. In the following, description is given of a case in which the palm print feature point extracting unit 11 approximates the curves of the line of Heart and the line of Life.

In this case, the palm print feature point extracting unit 11, as in the above-described embodiments, sets, as the line of Life, a line having one end point being closest to a thumb-side boundary of a subject region among the lines joining the selected wrinkle pixels. Further, the palm print feature point extracting unit 11 sets, as the line of Heart, a line having one end point being closest to a little-finger-side boundary of the subject region among the lines joining the selected wrinkle pixels.

The palm print feature point extracting unit 11 approximates the line of Heart and the line of Life by a quadratic curve such as a circle, an ellipse, or a hyperbolic curve, by using, for example, a least squares method. Alternatively, the palm print feature point extracting unit 11 may approximate the line of Heart and the line of Life by a cubic or higher curve by applying spline interpolation to the line of Heart and the line of Life.

For example, the line of Heart and the line of Life are approximated by the curves each representing an ellipse as expressed by equations below.

$$\frac{(x-c_k)^2}{a_k^2} + \frac{+(y-d_k)^2}{b_k^2} = 1 \qquad (1)$$

$$\frac{(x-c_s)^2}{a_s^2} + \frac{+(y-d_s)^2}{b_s^2} = 1 \qquad (1)'$$

Equation (1) represents approximation curves of the line of Heart. Equation (1)' represents approximation curves of the line of Life. The symbols $a_k$, $b_k$, $c_k$, $d_k$, $a_s$, $b_s$, $c_s$, and $d_s$ are constants. Further, x and y respectively represent a horizontal coordinate and a vertical coordinate on a palm print image. It is assumed that a tangent line to the line of Heart and a tangent line to the line of Life are represented by tangent lines to the approximation curves representing the line of Heart and the line of Life. In this case, the gradient $g_k$ of a tangent line to the line of Heart at the coordinates ($i_k$, $j_k$) on the approximation curve of the line of Heart, and the gradient $g_s$ of a tangent line to the line of Life at the coordinates ($i_s$, $j_s$) on the approximation curve of the line of Life are expressed by equations (2) below.

$$g_k = -\frac{b_k^2 i}{a_k^2 j}, \; g_s = -\frac{b_s^2 i}{a_s^2 j} \qquad (2)$$

The palm print feature point extracting unit 11 calculates $g_k$ and $g_s$, while changing the pair of ($i_k$, $j_k$) and ($i_s$, $j_s$). When the pair of $(i_k, j_k)$ and $(i_s, i_s)$ that makes $g_k=g_s$ is detected, the palm print feature point extracting unit 11 sets $(i_k, j_k)$ as the feature point K of the palm print, and sets $(i_s, i_s)$ as the feature point S of the palm print. When a plurality of pairs of $(i_k, j_k)$ and $(i_s,$ is) that make $g_k=g_s$ are detected, the palm print feature extracting unit 11 sets $(i_k, j_k)$ as the feature point K of the palm print, and sets $(i_s, i_s)$ as the feature point S of the palm print, the pair of $(i_k, j_k)$ and $(i_s, i_s)$ having the largest distance among the plurality of pairs of $(i_k, j_k)$ and $(i_s, i_s)$.

Figure 8A:
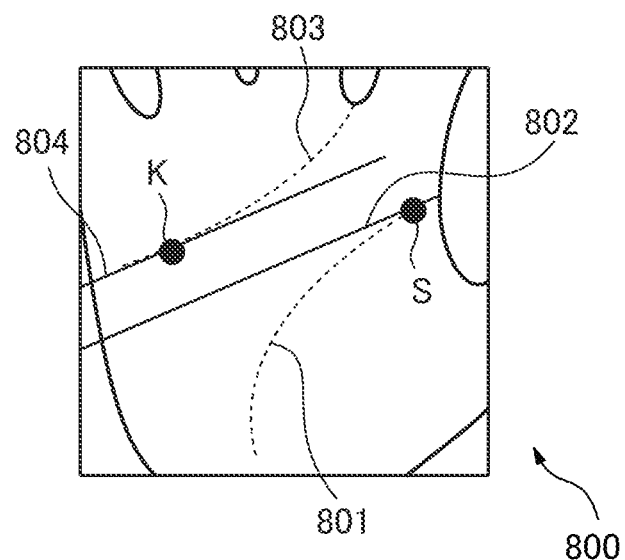
FIG. 8A is a diagram illustrating feature points of a palm print to be extracted in a modified example.

FIG. 8A is a diagram illustrating feature points of a palm print extracted in the above-described modified example. In a palm print image 800 illustrated in FIG. 8A, a tangent line 802 to an approximation curve 801 of the line of Life at a point S and a tangent line 804 to an approximation curve 803 of the line of Heart at a point K are parallel to each other. In this case, the angle between the tangent line 802 and the tangent line 804 is 0°. In other words, the angle between the pair of the tangent line 802 and the tangent line 804 is the smallest among the pairs of tangent lines to the approximation curve 801 and tangent lines to the approximation curve 803. Therefore, the point S and the point K are extracted as the feature points of the palm print.

On the other hand, when there is no pair of $(i_k, j_k)$ and $(i_s, j_s)$ that makes $g_k=g_s$, the palm print feature point extracting unit 11 obtains an angle $\theta_k$ between a line segment $k_s$ joining $(i_k, j_k)$ and $(i_s, j_s)$ and a tangent line to the line of Heart at $(i_k, j_k)$, and an angle $\theta_s$ between the line segment $k_s$ and a tangent line to the line of Life at $(i_s, j_s)$, for each pair of $(i_k, j_k)$ and $(i_s, j_s)$. The palm print feature point extracting unit 11 sets $(i_k, j_k)$ as the feature point K, and sets $(i_s, j_s)$ as the feature point S, when $(\tan \theta_k + \tan \theta_s)$ is the smallest.

Figure 8B:
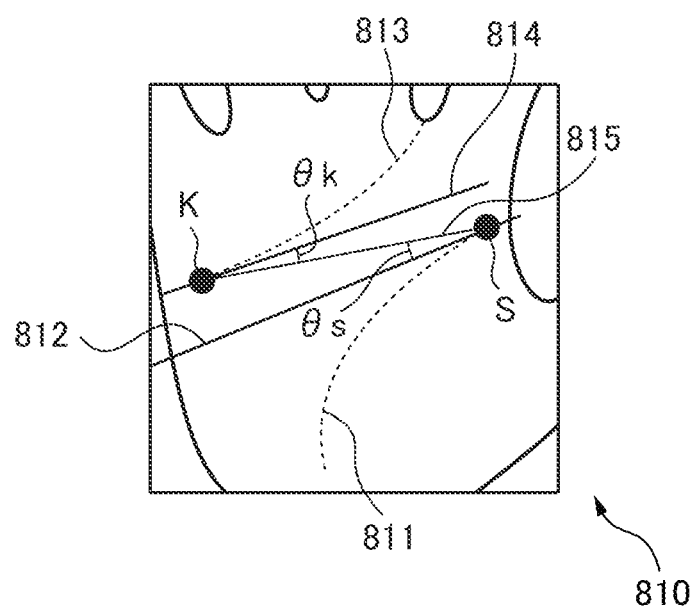
FIG. 8B is a diagram illustrating feature points of a palm print to be extracted in the modified example.

FIG. 8B is a diagram illustrating feature points of a palm print extracted in the above-described modified example. In a palm print image 810 illustrated in FIG. 8B, the angle to between a tangent line 812 to an approximation curve 811 of the line of Life at the point S and a line 815 joining the point S and the point K is expressed by $\theta_s$. Further, the angle between a tangent line 814 to an approximation curve 813 of the line of Heart at the point K and the line 815 is expressed by $\theta_k$. When $(\tan \theta_k + \tan \theta_s)$ is the smallest, the point S and the point K are extracted as feature points of the palm print.

According to the above-described modified example, even when a principal line of a palm print and an end of a subject region do not intersect each other, the palm print feature point extracting unit 11 can extract feature points of the palm print on the basis of a principal line that is relatively easily detected on a palm print image.

Further, the palm print feature point extracting unit 11 may switch the feature points to be used in correcting the position, the orientation, and the like of a vein pattern, depending on whether or not an end of a subject region and a principal line intersect each other. For example, the palm print feature point extracting unit 11 judges whether or not a line extending from a thumb-side end point of the line of Life along the line of Life and a thumb-side end of a subject region intersect each other, and whether or not a line extending from a little-finger-side end point of the line of Heart along the line of Heart and a little-finger-side end of the subject region intersect each other. The line extending from the line of Life and the line extending from the line of Heart can be obtained by spline interpolation, for example. When both of the line extending from the line of Life and the line extending from the line of Heart intersect an end of the subject region, the palm print feature point extracting unit 11 sets the thumb-side end point of the line of Life as the feature point S of the palm print, and sets the little-finger-side end point of the line of Heart as the feature point K of the palm print. On the other hand, when at least one of the line extending from the line of Life and the line extending from the line of Heart does not intersect an end of the subject region, the palm print feature point extracting unit 11 may obtain the feature points K and S of the palm print on the basis of tangent lines to the approximation curves of the line of Heart and the line of Life as in the above-described modified example. In this way, the palm print feature point extracting unit 11 can use the feature points that are easier to extract, by switching the feature points of the palm print to extract, depending on whether or not an end of the subject region intersects a principal line.

Further, according to another modified example, the correcting unit 12 may correct a vein pattern on a vein image acquired at the time of carrying out the biometric authentication process, in such a manner that the position, the orientation, and the like of the vein pattern on the vein image coincide with the position, the orientation, or the like of the vein pattern on a vein image acquired at the time of carrying out the registration process. In this case, the correcting unit 12 does not need to correct the orientation, the position, and the like of the vein pattern on the vein image at the time of carrying out the registration process. In place of this, the correcting unit 12 may obtain the coordinates of the middle point C between the reference points K' and S' on the vein image, the angle of a line joining the reference points K' and S' with respect to a horizontal direction, and a distance between the reference points K' and S', and passes these values to the registration unit 16. The registration unit 16 stores, in the storage device 5, the coordinates of the middle point C, the angle of the line joining the reference points K' and S' with respect to the horizontal direction, and the distance between the reference points K' and S' together with matching feature information.

At the time of carrying out the biometric authentication process, the correcting unit 12 reads out, from the storage device 5, the coordinates of the middle point C, the angle of the line joining the reference points K' and S' with respect to the horizontal direction, and the distance between the reference points K' and S'. Then, the correcting unit 12 performs parallel translation of each pixel on the vein image so that the middle point C on the vein image acquired at the time of carrying out the biometric authentication process coincides with the readout middle point C. Further, the correcting unit 12 rotates each pixel on the vein image around the middle point C so that the orientation of a line joining the reference points K' and S' on the vein image acquired at the time of carrying out the biometric authentication process coincides with the readout gradient. Furthermore, the correcting unit 12 corrects the scale of the rotated and corrected vein image so that the distance between the reference points K' and S' on the vein image acquired at the time of carrying out the biometric authentication process coincides with the readout distance.

Further, according to yet another modified example, the correcting unit 12 may correct the position, the length, and the gradient of each line segment, which are the feature portions of a vein pattern extracted as the matching feature information by the feature extracting unit 13, in place of correcting a vein pattern on a vein image. In this case, the correcting unit 12 applies affine transformation to both end points of each line segment by using an affine transformation coefficient obtained from a parallel translation amount, a rotation amount, and a scale adjustment amount obtained on the basis of the reference points K' and S'. Thus, it is possible to obtain the corrected position, length, and gradient of each line segment.

According to the above-described modified example, the number of points to be corrected is reduced, as compared with a case in which a vein pattern on a vein image itself is corrected. This makes it possible to reduce the computation amount of the correcting unit 12.

Further, a palm print of the user's hand may be included in a vein image obtained by capturing a vein pattern of the user's hand by the biometric information acquiring unit 4. In such a case, according to still another modified example, the palm print feature point extracting unit 11 may extract two feature points of the palm print from the vein image. In this case, lines obtained by thinning in the subject region, which are obtained by carrying out the same process as described in the present embodiments for the vein image, include not only the vein pattern but also the principal lines of the palm print. The principal lines of the palm print are relatively long, and extend to the vicinity of an end of the subject region. In view of the above, the palm print feature point extracting unit 11 may set, as the principal lines, a predetermined number of longest lines from among the thinned lines each having one end located within a predetermined distance (e.g. 5 pixels) from an end of the subject region.

Figure 9:
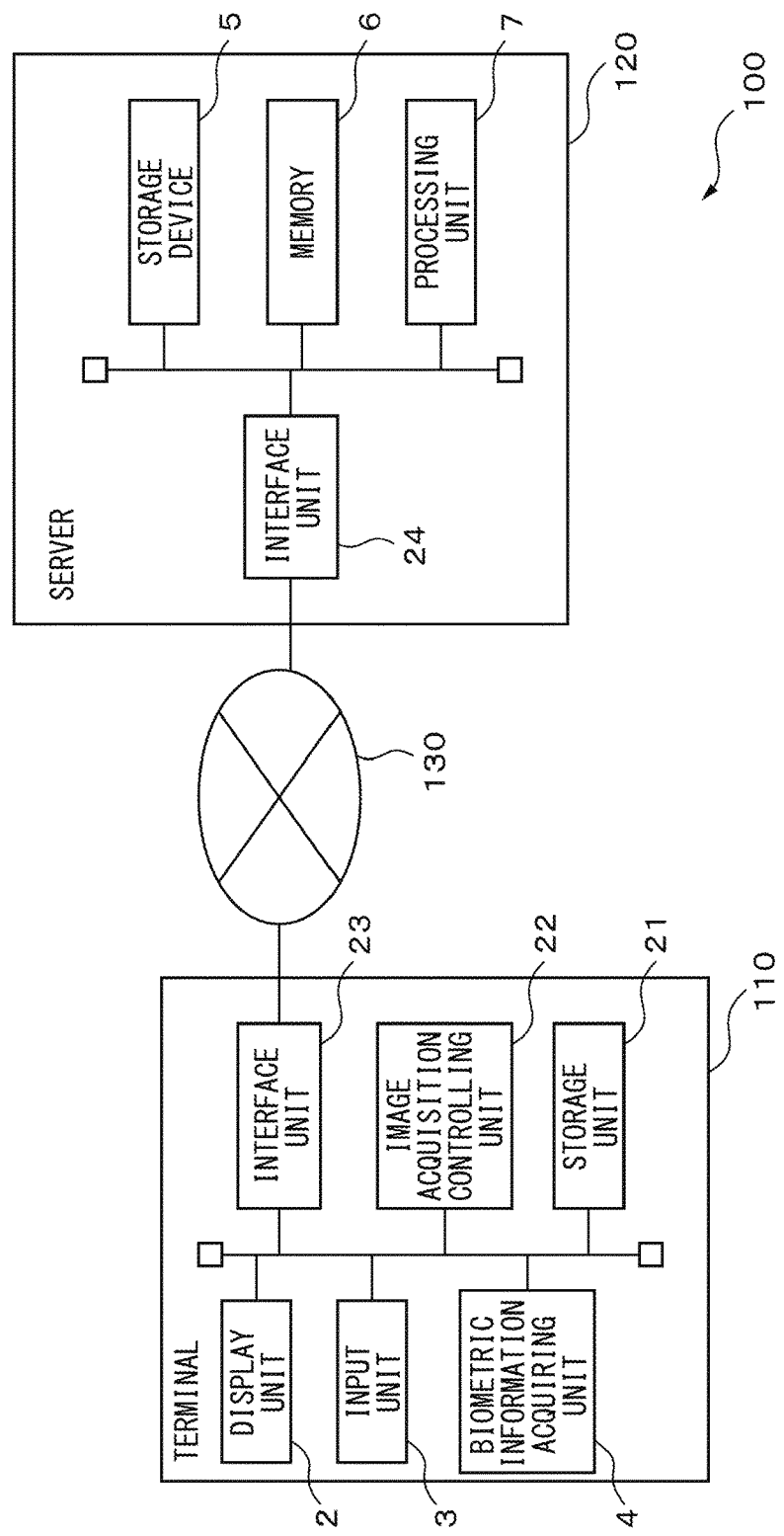
FIG. 9 is a diagram schematically illustrating the configuration of an example of a computer system in which the biometric authentication apparatus according to any one of the embodiments and the modified examples of the embodiments is incorporated.

FIG. 9 is a diagram schematically illustrating the configuration of an example of a computer system for carrying out the biometric authentication process or the registration process according to any one of the above-described embodiments and the modified examples of the embodiments. For example, a computer system 100 includes at least one terminal 110 and a server 120. The terminal 110 and the server 120 are connected via a wired or wireless communication network 130. Note that, in FIG. 9, among components included in the computer system 100, each component corresponding to any of components included in the biometric authentication apparatus 1 illustrated in FIG. 1 is denoted by the same reference number as the component included in the biometric authentication apparatus 1.

In this system, the terminal 110 is, for example, a stationary terminal, and includes a display unit 2, an input unit 3, and a biometric information acquiring unit 4. The terminal 110 also includes a storage unit 21, an image acquisition controlling unit 22, and an interface unit 23.

The storage unit 21 includes, for example, a semiconductor memory circuit, and temporarily stores a vein image generated by the biometric information acquiring unit 4. The image acquisition controlling unit 22 includes one or more processors and peripheral circuits thereof, controls each unit of the terminal 110, and executes various kinds of programs that operate on the terminal 110. Then, the image acquisition controlling unit 22 transmits the vein image and the palm print image generated by the biometric information acquiring unit 4, to the server 120 via the interface unit 23 including an interface circuit for connecting the terminal 110 to the communication network 130. The image acquisition controlling unit 22 may also transmit user identification information entered via the input unit 3, to the server 120.

The server 120 includes a storage device 5, a memory 6, a processing unit 7, and an interface unit 24 including an interface circuit for connecting the server 120 to the communication network 130. The processing unit 7 of the server 120 carries out the biometric authentication process or the registration process by implementing the function of each unit incorporated in the processing unit according to any one of the above-described embodiments and the modified examples of the embodiments, by using the vein image and the palm print image received via the interface unit 24. Then, when the processing unit 7 carries out the biometric authentication process, the server 120 returns a determination result indicating whether the authentication succeeded or not, to the terminal 110 via the interface unit 24.

Alternatively, the image acquisition controlling unit 22 of the terminal 110 may carry out the processes of the palm print feature point extracting unit 11, the correlating unit 17, the correcting unit 12, and the feature extracting unit 13 among the functions of the processing unit according to any one of the above-described embodiments. In this case, matching feature information extracted from a vein image of the user and identification information of the user may be transmitted from the terminal 110 to the server 120. Meanwhile, the processing unit 7 of the server 120 carries out all the processes other than those of the palm print feature point extracting unit 11, the correlating unit 17, the correcting unit 12, and the feature extracting unit 13 among the functions of the processing unit according to any one of the above-described embodiments. In this way, load on the server 120 is reduced, and hence the computer system 100 can reduce an increase in waiting time for the user, even when a number of biometric authentication processes are performed at the same time.

A computer program including instructions for causing a computer to implement the functions of the processing unit according to any one of the above-described embodiments may be provided in the form recorded on a recording medium such as a magnetic recording medium, an optical recording medium, or a nonvolatile semiconductor memory. However, the computer-readable recording medium here does not include a carrier wave.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A biometric information correcting apparatus comprising:
    a processor configured to execute a process including:
        extracting two feature points of a palm print of a hand of a user from a first image obtained by a biometric information acquiring device;
        extracting a feature portion of a vein pattern of the hand of the user from a second image obtained by the biometric information acquiring device;
        determining a rotation angle according to a direction of a line connecting the two feature points of the palm print; and
        rotating the vein pattern of the hand on the second image or the feature portion of the vein pattern by the rotation angle.

2. The biometric information correcting apparatus according to claim 1, wherein
    the rotating the vein pattern rotates the vein pattern on the second image or the feature portion of the vein pattern so that an orientation of the line coincides with a predetermined direction.

3. The biometric information correcting apparatus according to claim 1, further comprising a storage device configured to store a second direction of a line connecting two points corresponding to two feature points of a palm print of a registered user's hand on a third image representing a vein pattern of the registered user's hand, wherein
the processor is configured to determine the rotation angle so that the direction coincides with the second direction.

4. The biometric information correcting apparatus according to claim 1, wherein
the extracting two feature points extracts a point on a first principal line of the palm print and a point on a second principal line of the palm print, as the two feature points.

5. The biometric information correcting apparatus according to claim 4, wherein
the extracting two feature points detects a region including the palm print on the first image, extracts a first end point of the first principal line at a position closer to a first end of the region, as one of the two feature points, and extracts a second end point of the second principal line at a position closer to a second end of the region on a side opposite to the first end, as the other one of the two feature points.

6. The biometric information correcting apparatus according to claim 4, wherein
the extracting two feature points extracts an intersection point between a first tangent line and a first curve obtained by approximating the first principal line as one of the two feature points and an intersection point between a second tangent line and a second curve obtained by approximating the second principal line as the other one of the two feature points, the first tangent line and the second tangent line being included in a pair of tangent lines forming a smallest angle each other among pairs of a tangent line to the first curve and a tangent line to the second curve, respectively.

7. The biometric information correcting apparatus according to claim 5, wherein,
the extracting two feature points extracts, when a first line extending from the first end point toward the first end along the first principal line intersects the first end, and a second line extending from the second end point toward the second end along the second principal line intersects the second end, the first end point and the second end point as the two feature points, and, when the first line and the first end do not intersect each other, or the second line and the second end do not intersect each other, an intersection point between a first tangent line and a first curve obtained by approximating the first principal line as one of the two feature points, and an intersection point between a second tangent line and a second curve obtained by approximating the second principal line as the other one of the two feature points, the first tangent line and the second tangent line being included in a pair of tangent lines forming a smallest angle each other among pairs of a tangent line to the first curve and a tangent line to the second curve, respectively.

8. A biometric information correcting method comprising:
extracting, by a processor, two feature points of a palm print of a user's hand from a first image obtained by a biometric information acquiring device;
extracting, by the processor, a feature portion of a vein pattern of the hand of the user from a second image obtained by the biometric information acquiring device;
determining, by the processor, a rotation angle according to a direction of a line connecting the two feature points of the palm print; and
rotating, by the processor, the vein pattern of the hand on the second image or the feature portion of the vein pattern by the rotation angle.

9. The biometric information correcting method according to claim 8, wherein
the rotating the vein pattern rotates the vein pattern on the second image or the feature portion of the vein pattern so that an orientation of the line coincides with a predetermined direction.

10. The biometric information correcting method according to claim 8, wherein
the determining the rotation anile determines the rotation angle so that the direction coincides with a second direction of a line connecting two points corresponding to two feature points of a palm print of a registered user's hand on a third image representing a vein pattern of the registered user's hand.

11. The biometric information correcting method according to claim 8, wherein
the extracting two feature points extracts a point on a first principal line of the palm print and a point on a second principal line of the palm print, as the two feature points.

12. The biometric information correcting method according to claim 11, wherein
the extracting two feature points detects a region including the palm print on the first image, extracts a first end point of the first principal line at a position closer to a first end of the region, as one of the two feature points, and extracts a second end point of the second principal line at a position closer to a second end of the region on a side opposite to the first end, as the other one of the two feature points.

13. The biometric information correcting method according to claim 11, wherein
the extracting two feature points extracts an intersection point between a first tangent line and a first curve obtained by approximating the first principal line as one of the two feature points and an intersection point between a second tangent line and a second curve obtained by approximating the second principal line as the other one of the two feature points, the first tangent line and the second tangent line being included in a pair of tangent lines forming a smallest angle each other among pairs of a tangent line to the first curve and a tangent line to the second curve, respectively.

14. The biometric information correcting method according to claim 12, wherein,
the extracting two feature points extracts, when a first line extending from the first end point toward the first end along the first principal line intersects the first end, and a second line extending from the second end point toward the second end along the second principal line intersects the second end, the first end point and the second end point as the two feature points, and, when the first line and the first end do not intersect each other, or the second line and the second end do not intersect each other, an intersection point between a first tangent line and a first curve obtained by approximating the first principal line as one of the two feature points, and an intersection point between a second tangent line and a second curve obtained by approximating the second principal line as the other one of the two feature points, the first tangent line and the second tangent line being included in a pair of tangent lines forming a smallest angle each other among pairs of a tangent line to the first curve and a tangent line to the second curve, respectively.

15. A non-transitory computer-readable recording medium having recorded thereon a computer program for correcting biometric information that causes a computer to execute a process comprising:
   extracting two feature points of a palm print of a user's hand from a first image obtained by a biometric information acquiring device;
   extracting a feature portion of a vein pattern of the hand of the user from a second image obtained by the biometric information acquiring device;
   determining a rotation angle according to a direction of a line connecting the two feature points of the palm print; and
   rotating the vein pattern of the hand on the second image or the feature portion of the vein pattern by the rotation angle.

16. A biometric information correcting apparatus comprising:
   a processor configured to execute a process including:
      extracting two feature points of a palm print of a hand of a user from an image obtained by a biometric information acquiring device capturing the hand and representing a vein pattern of the hand and the palm print;
      extracting a feature portion of the vein pattern of the hand of the user from the image;
      determining a rotation angle according to a direction of a line connecting the two feature points; and
      rotating the vein pattern on the image or the feature portion of the vein pattern by the rotation angle.

* * * * *